J. E. DEMPSEY.
DIRIGIBLE HEADLIGHT.
APPLICATION FILED FEB. 8, 1916.
1,244,713.
Patented Oct. 30, 1917.
3 SHEETS—SHEET 1.
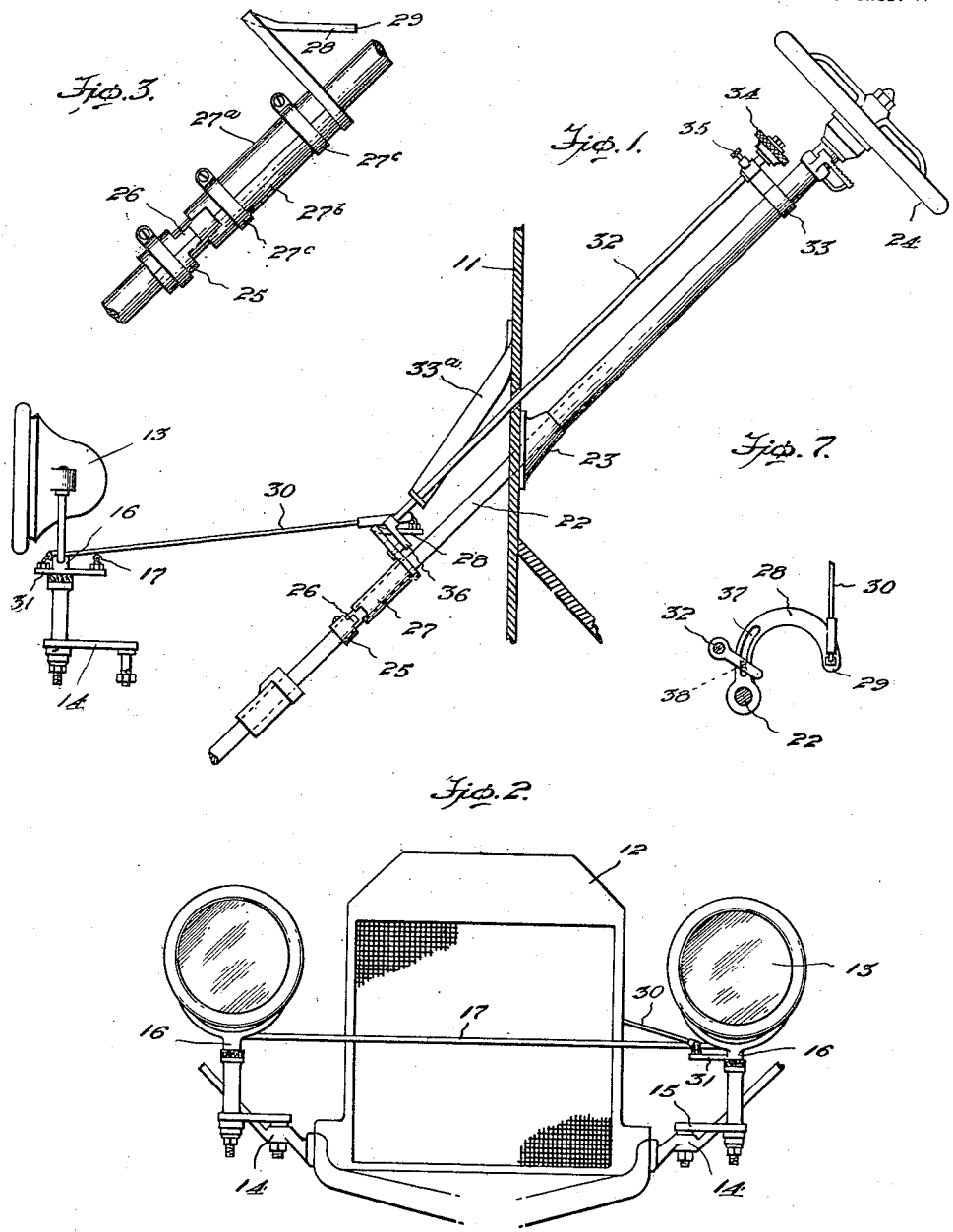

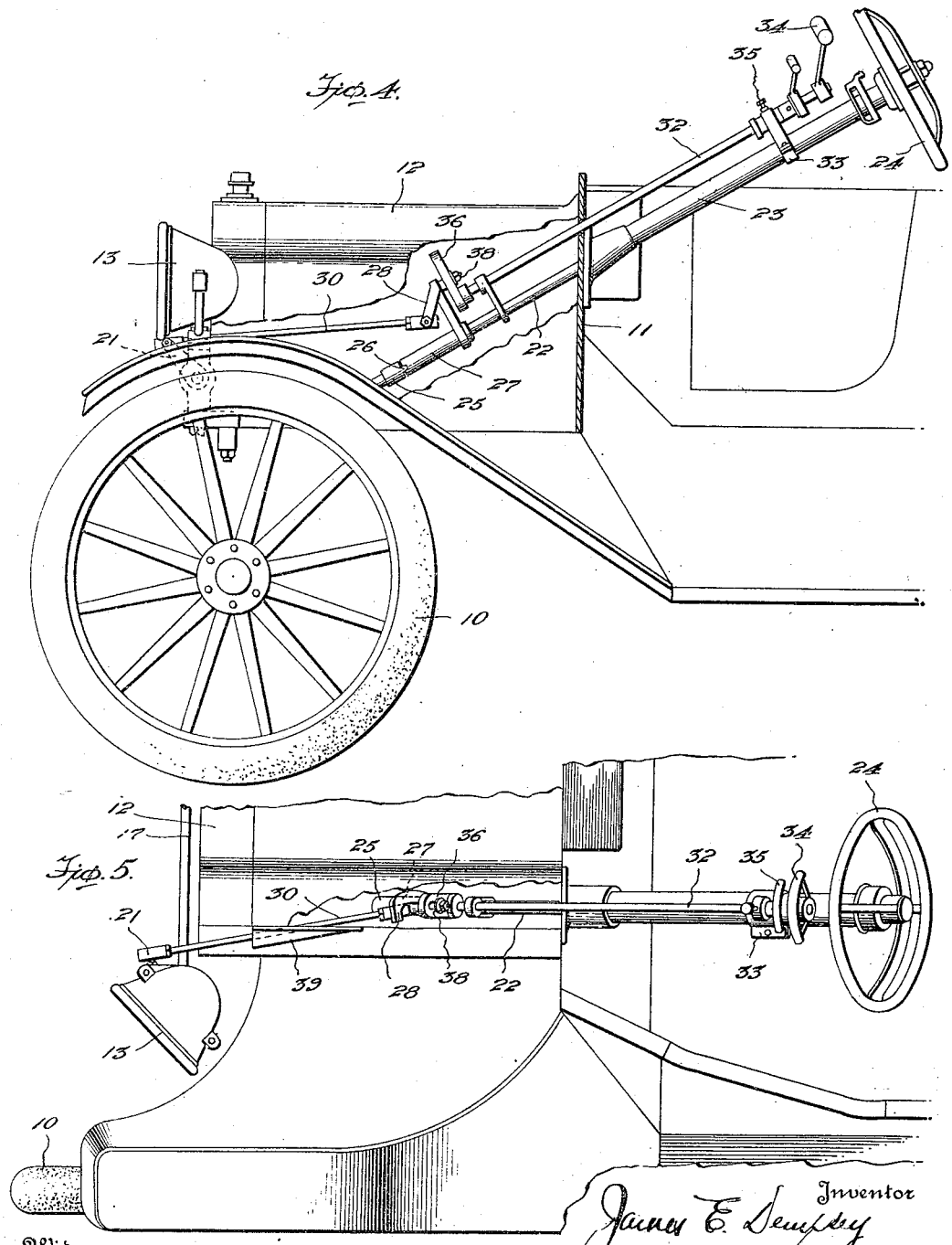

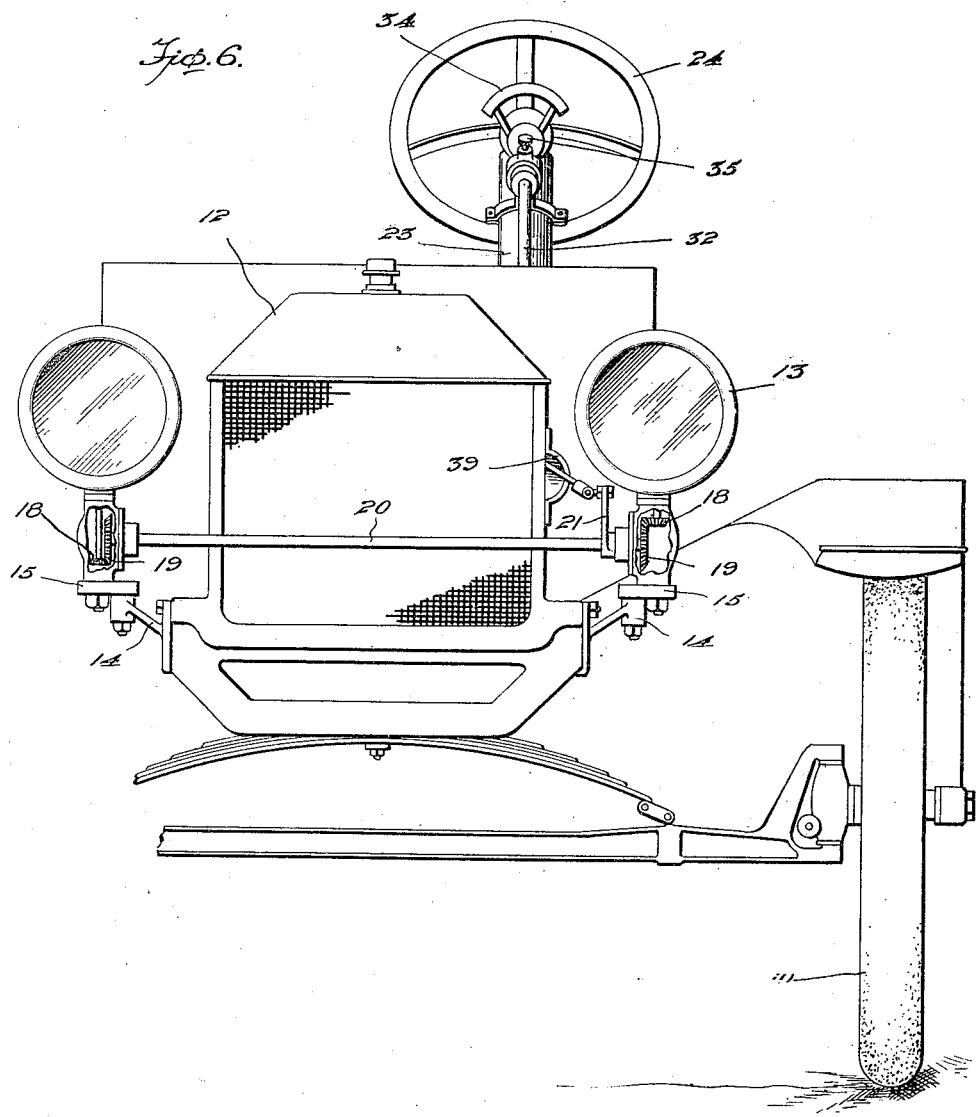

UNITED STATES PATENT OFFICE.

JAMES E. DEMPSEY, OF MANITOWOC, WISCONSIN.

DIRIGIBLE HEADLIGHT.

1,244,713.  Specification of Letters Patent.  Patented Oct. 30, 1917.

Application filed February 8, 1916. Serial No. 76,965.

*To all whom it may concern:*

Be it known that I, JAMES E. DEMPSEY, a citizen of the United States, residing at Manitowoc, in the county of Manitowoc and State of Wisconsin, have invented certain new and useful Improvements in Dirigible Headlights; and I do hereby declare the following to be a full, clear, and exact description of the invention, such as will enable others skilled in the art to which it appertains to make and use the same.

This invention is a headlight control for motor vehicles in which the headlights may be moved in the direction of travel of the vehicle, but may be retained in a predetermined position.

The device is particularly adapted as an auxiliary attachment for motor vehicles, wherein fixed headlights may be readily changed to automatically movable lights actuated by the steering control mechanism of the vehicle, the lights being quickly placed into and out of coacting engagement with the steering control mechanism by manually controlled instrumentalities. The device is furthermore capable of manipulation manually independently of the steering control mechanism.

In a practical form of the invention, there is provided a movable sleeve which may be mounted on a part of the steering post, such as near its lower end, the sleeve being mounted on that portion of the device which rotates to control the direction of travel of the steering wheels of the vehicle. The headlights are pivotally mounted upon a suitable part of the vehicle and are preferably coupled for simultaneous movement by a connecting rod.

One of the headlights is connected with the sleeve by a pull rod to move the light when motion is imparted to the rod by the movement of the sleeve.

The sleeve is capable also of manipulation to control the movement of the headlights by manually controlled devices which may be actuated by means positioned near the steering wheel of the vehicle, whereby the headlights may be retained in a predetermined position, or moved in various directions independently of the direction of travel of the vehicle.

Various parts of the device are designed to be readily attached to motor vehicles of standard types without changing the structure of the parts of the vehicle or defacing or injuring the material of the vehicle, the idea being to provide a simple, and comparatively inexpensive device which can be applied by unskilled labor.

Other features of advantage will appear in the course of the following detail description.

In the drawings:—

Figure 1 is a side elevation, parts being in section, disclosing an arrangement of the device as applied to a direct acting steering post.

Fig. 2 is a front elevation disclosing a plurality of lamps.

Fig. 3 is a detail view of a steering post sleeve.

Fig. 4 is a side elevation, parts being broken away, disclosing a modification of the lamp moving elements.

Fig. 5 is a plan view.

Fig. 6 is a front elevation, disclosing means for rotating the lamp; and

Fig. 7 is a detail view of coacting arms of the steering post and shifting sleeve.

A type of automobile is disclosed in the drawings, wherein the steering post is provided with direct connection with the steering wheels, such wheels being indicated at 10 in the drawings. The dash board is indicated at 11 and the hood of the engine at 12. These elements may be of the usual construction. The headlights are indicated at 13 and may be of any desired type. The ordinary bracket for the lamps is indicated at 14 in Fig. 2. This bracket is provided for fixedly mounting the lamps. In order to enable the lamps to swing relative to the engine hood 12, it is desirable in some types of motor vehicles to mount the lamps at a greater distance from the engine hood than is the custom when stationary lamps are provided. To permit of the rotation of the lamps in such instances, there may be provided a suitable bracket indicated at 15 to receive a pivotal post 16 which mounts the lamp. Moreover, the lamps may be connected for simultaneous movement by a connecting rod 17 which may have pivotal connection with a suitable part of the pivotal post 16.

In Fig. 6, the lamps are shown mounted upon the bracket 15, and in lieu of the pivotal post 16, the lamp may be provided with a spindle which terminates in a gear 18, said gear meshing with a master gear 19 carried by a rotatable connecting rod 20. This rod may be rotated by a crank arm 21 shown more particularly in Figs. 4, 5 and 6 of the drawings.

The steering post of the vehicle is indicated at 22, and in some types of vehicles is mounted from the dash board 11 by suitable supporting means, indicated by a sleeve 23. The steering wheel is indicated at 24 for rotating the post 22, and suitable means may be employed, not shown, to connect the post directly with the steering wheels 10, whereby the wheels may be moved simultaneously with the movement of the steering post, as distinguished from those types of devices wherein the motion of the steering post is communicated to the steering wheels through gear mechanism.

The steering post 22 may be provided with a clutch member 25 shown provided with a tooth 26. This clutch member may be secured at any desired position on the post for movement with the post. Suitably mounted on the post between the clutch member 25 and the steering wheel 24 is a sleeve 27 which is movably mounted on the post 22, and this sleeve is provided with means to be engaged by the tooth 26 of the clutch member when the sleeve is moved into coöperative relation to the clutch member 25.

The sleeve 27 may be slipped over an end of the steering post, or it may be formed in sections 27ª, 27ᵇ, and secured to the steering post by any suitable means, such as couplings (see Fig. 3). In like manner, the clutch member 25 may be so applied to the steering post.

A lamp directing arm 28 is secured to the sleeve 27 and, where the steering post is positioned adjacent the engine or other parts of the equipment of the vehicle, thereby limiting the space within the hood, the arm 28 is preferably arcuate in form. Where the steering post is positioned at an angle to the dash board 11, this arm may be in the form of a segment of a spiral. In Fig. 1, this spiral section is shown directed upwardly, and to the free end 29 thereof may be pivotally attached a pull rod 30, the other end of this rod 30 being pivotally connected with a crank arm 21 or directly connected with a lamp bracket arm 31. By this arrangement of the sleeve arm, it is possible to transmit motion from the angular steering post to the perpendicular lamp post, in a minimum of space within the hood. If desired, the bracket arm 31 may be positioned at one side of a lamp, while the connecting rod arms 17 may be at the rear of the lamps, it being understood that the movement of one of the lamps will be communicated by the connecting rod to both lamps.

While the sleeve 27 is shown adapted to be operated by the steering post, when placed into operative engagement with the clutch member 25, said sleeve 27 may be manually operated by suitable means carried by the steering post. In a practical embodiment of the invention, there is disclosed a manually controlled rod 32, which is shown mounted parallel with the steering post 22 by means of suitable brackets 33. This rod 32 may be provided at its upper end with any suitable means, such as a hand wheel 34 for rotating the rod and reciprocating said rod relative to the steering post as shown in Fig. 1, or such means may be in the form disclosed in Fig. 5, or any other preferred form. On the upper bracket 33, is preferably provided suitable means such as a thumb screw 35 to maintain the rod 32 in a predetermined position and prevent it from reciprocating relative to the steering post. Near the lower end of the rod 32 there is shown a sleeve shifting arm 36 which is preferably provided with a slot indicated at 37 through which may pass a bolt 38, or any equivalent means to operatively connect the lamp directing arm 28 of the sleeve with the sleeve shifting arm 36. These arms are preferably arranged to cross each other at an angle, which angularity is changed as the lamps are to be moved in various directions. By this rod 32 and hand wheel 34, the sleeve 27 may be raised upwardly on the steering post 22, out of engagement with its clutch 25, whereby the headlights may be moved to various positions irrespective of the direction of travel of the vehicle, or the movement of the steering wheels thereof, or the lamps can be retained in a disengaged position, as would be desired when running the vehicle in the day time.

When it is desired to have the lamps moved coincident with the movement of the steering wheels, the manually controlled rod 32 may be pressed downwardly to have the sleeve 27 engage its clutch 25, thereby transmitting any movement of the steering post 22 to the lamps, through the arm 28, as well as transmitting such motion to the steering wheels.

In Fig. 4, the lamp directing arm 28 is shown as a segment of a spiral, but the arm is directed downwardly instead of upwardly, and this form of device may be found desirable where the mechanism in the hood occupies the space which would ordinarily receive the mechanism which includes the upwardly directed arm. By this upwardly directed arm, the pull rod 30 may be positioned alongside of the interior of the hood 12, or may be then extended exteriorly of the hood, having the arm 28 protrude through an opening in the hood.

It is to be understood that this device can be readily attached to motor vehicles without injuring the parts thereof, only one perforation being required in the dash board 11, where a separate rod 32 is used, and a perforation being formed in the hood 12, such perforation being indicated at 39, and shown at the front of the hood, although the perforation 39 may be made at other parts of the hood.

Having thus described my invention, what I claim as new and desire to secure by Letters Patent, is:—

1. A control for vehicle headlights comprising a steering post, a movable lamp, lamp actuating means connected with the lamp, means to transmit the movements of the steering post to the lamp actuating means, and a manually controlled element mounted on the steering post for reciprocating and rotating movements and connected with the lamp actuating means to move the lamp independently of the movements of the steering post.

2. A control for headlights comprising a steering post having clutch mechanism thereon, a movable lamp, lamp actuating means operated by rotation of the steering post, and a manually controlled element connected with the lamp actuating means to independently move the lamp, said manually controlled element being mounted for reciprocating movements to actuate said clutch mechanism.

3. A control for vehicle headlights, comprising a steering post, a pivotally mounted lamp, a manually controlled rod having means to effect its rotative movement and longitudinal movement, means to connect said rod with the lamp whereby the lamp may be moved by the rotative movement of the rod, and means actuated by the longitudinal movement of the rod whereby the lamp may be actuated by the movement of the steering post.

4. A control for vehicle headlights comprising a steering post, a clutch sleeve mounted thereon for movement independently of the post, a clutch member fixedly mounted to the post to engage the sleeve, and means to connect said clutch sleeve with manually operated devices whereby the sleeve may be rotated in unison with the steering post.

5. A control for vehicle headlights comprising a steering post, a sleeve mounted thereon for reciprocating movement independently of the post, manually operated means carried by the post to engage the sleeve and move the latter independently of the movement of the post, said manually operated means also operative to move the sleeve longitudinally on the post to a predetermined position to actuate the same by the steering post, and means whereby the rotative movements of the sleeve may be communicated to the vehicle headlight.

6. A control for vehicle headlights, comprising a steering post, a sleeve slidably and rotatably mounted thereon, a manually controlled element carried by the post and connected with the sleeve to move the sleeve into operative engagement with the steering post for simultaneous rotation therewith and to move the sleeve out of operative engagement with the post to rotate the sleeve independently of the movement of the post, connected headlights pivotally mounted on the vehicle, and means to transmit rotative movements of the sleeve to a headlight.

7. A control for vehicle headlights comprising a steering post having a clutch member secured thereto, a sleeve slidably mounted thereon and capable of rotative movement independently of the movement of the steering post, said sleeve having an arm extending therefrom, a manually controlled rod mounted for rotative movement independently of the steering post, said rod being provided with an arm near its lower end to be connected with the sleeve, means to operatively connect said arm with the sleeve to be actuated thereby when said sleeve is moved into engagement with said clutch, and means to connect said sleeve arm with a pivotally mounted headlight.

8. A control for vehicle headlights comprising a steering post, a sleeve having means whereby the sleeve may be rotated in unison with the post and may be moved independently of the movement of the post, said sleeve being provided with an arcuate arm, means to connect said arm with a pivotally mounted headlight, a manually controlled rod having a slotted arm, and means engaging the sleeve arm and passing through said slotted arm to transmit movement from the rod to the sleeve.

9. A control for vehicle headlights comprising a steering post, a sleeve mounted for longitudinal adjustment on the post and provided with an arm, means to connect said arm with the pivotally mounted headlights, means to revolve said sleeve independently of the movement of the steering post, means to move the sleeve longitudinally of the post whereby said sleeve may be brought into and out of engagement with means on the post for effecting the movement of the sleeve in unison with the movement of the post.

10. In a control for vehicle lamps comprising a steering post, a manually controlled rod mounted in coöperative relation to the steering post and having means to effect its rotative movement independently of that of the steering post, said means serving also to shift the rod longitudinally in its bearings, a clutch carried by the steering post and having connection with a pivotally mounted lamp, whereby the movements of the steering post will be communicated to the pivoted lamp, said clutch having a member thereof connected with a control rod whereby the longitudinal shifting of the control rod will disengage the clutch members to permit the lamp to be shifted by the control rod independently of the movements of the steering post.

11. In a control for vehicle headlights, a manually controlled rod having a slotted sleeve shifting arm, a sleeve adapted to be carried by a vehicle steering post, said sleeve having a lamp directing arm which is adapted to be positioned at an angle relative to the sleeve shifting arm of the rod, and means slidable in the slot of the sleeve shifting arm to pivotally connect the arms of the sleeve and rod.

12. A control for vehicle lamps comprising a steering post, a manually controlled rod mounted in coöperative relation to the steering post, means whereby said rod may be rotated and shifted longitudinally in its bearings, a clutch comprising a fixed member and a movable member carried by the steering post, means to connect the movable member with the control rod to bring the clutch members into and out of engagement by the longitudinal shifting of the control rod, a movable lamp, and means to connect the lamp with the movable member of the clutch.

13. A control for vehicle lamps comprising a steering post, a manually controlled rod mounted in coöperative relation to the steering post, means whereby said rod may be rotated and shifted longitudinally in its bearings, a clutch comprising a fixed member of complemental sections secured to the steering post, and a slidable member of complemental sections whereby the clutch may be quickly applied to the steering post, the movable clutch member being provided with a lamp directing arm, a pivoted lamp, means to connect the arm of the clutch member with the lamp, and pivotal connection between said lamp directing arm and the control rod to actuate the clutch and also to transmit the movements of the control post to the lamp.

14. A control for vehicle lamps comprising a manually controlled rod, means to rotate said rod and to shift the same longitudinally, a clutch comprising a fixed member and a movable member, the movable member of said clutch being provided with an arcuate arm, a member of the lamp having means of connection with the arm of the clutch whereby the movement of the clutch arm will be communicated to the lamp, and means to connect the manually controlled rod with the arcuate arm intermediate the clutch and its lamp connecting means to vary the position of the movable clutch member and to control the movement of the clutch arm, whereby the movement of the lamp may be governed solely by the manually controlled rod.

15. A control for vehicle lamps comprising a steering post, a manually controlled rod, means to rotate said rod and shift the same longitudinally, a clutch having a fixed member and a movable member carried by the steering post, said movable member being provided with an arm substantially in the form of a segment of a spiral, a movable lamp, and means to connect the arm with the lamp, said control rod having an arm provided with means to have pivotal and slidable engagement with the arm of the clutch to wholly control the movement of the clutch arm and the lamp by the manually controlled rod, said clutch member being movable by the rod to effect engagement with the other clutch member whereby the arm and the lamp may be moved by the movements of the steering post.

16. A control for vehicle lamps comprising a steering post, a manually controlled rod having means to rotate the same and move said rod longitudinally, a movable lamp, means carried by the steering post to actuate the lamp, a clutch whereby the movement of the steering post may be communicated to the lamp, means actuated by the longitudinal movement of the control rod whereby the movement of the lamp will be solely under the control of the rod and independently of the movement of the steering post, and locking means to control the operation of the control rod.

In testimony whereof, I affix my signature, in presence of a witness.

JAMES E. DEMPSEY.

Witness:
J. F. H. MOTHERSHEAD.

Copies of this patent may be obtained for five cents each, by addressing the "Commissioner of Patents, Washington, D. C."